United States Patent
Ho et al.

(10) Patent No.: US 6,384,139 B1
(45) Date of Patent: May 7, 2002

(54) CROSSLINKED ELASTOMERS PROCESSES FOR THEIR MANUFACTURE AND ARTICLES MADE FROM THESE ELASTOMERS

(75) Inventors: Thoi H. Ho, Lake Jackson; Morgan M. Hughes, Angleton; Robert T. Johnston, Lake Jackson; Jimmy D. Allen, Brazoria, all of TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/229,109

(22) Filed: Jan. 12, 1999

Related U.S. Application Data

(63) Continuation-in-part of application No. 08/678,909, filed on Jul. 12, 1996, now abandoned.

(51) Int. Cl.$^7$ .................................................. C08F 8/30
(52) U.S. Cl. ................ 525/123; 525/327.6; 525/327.7; 525/359.3; 525/384; 525/385
(58) Field of Search ................................ 525/123, 327.7, 525/359.3, 384, 385, 327.6

(56) References Cited

U.S. PATENT DOCUMENTS

| | | | |
|---|---|---|---|
| 3,222,420 A | 12/1965 | Heppolette | 260/837 |
| 3,236,917 A | 2/1966 | Natta et al. | 260/878 |
| 3,354,116 A | 11/1967 | Gruver et al. | 260/41.5 |
| 3,390,206 A | 6/1968 | Thompson et al. | 260/875 |
| 3,409,595 A | 11/1968 | Mueller et al. | 260/77.5 |
| 3,645,992 A | 2/1972 | Elston | 260/80.78 |
| 4,012,270 A | 3/1977 | Fitko | 156/306 |
| 4,076,698 A | 2/1978 | Anderson et al. | 526/348.6 |
| 4,130,535 A | 12/1978 | Coran et al. | 260/33.6 AQ |
| 4,134,927 A | 1/1979 | Tomoshige et al. | 260/878 |
| 4,440,911 A | 4/1984 | Inoue et al. | 525/301 |
| 4,456,732 A | 6/1984 | Nambu et al. | 525/65 |
| 4,486,571 A | 12/1984 | Holubka | 525/110 |
| 4,528,329 A | 7/1985 | Inoue et al. | 525/74 |
| 4,548,985 A | 10/1985 | Yazaki et al. | 525/65 |
| 4,585,813 A | 4/1986 | Brown et al. | 523/409 |
| 4,619,969 A | 10/1986 | Doi et al. | 525/93 |
| 4,624,885 A | 11/1986 | Mumford et al. | 428/222 |
| 4,687,810 A | 8/1987 | Coran | 525/74 |
| 4,735,992 A | 4/1988 | Nogues | 525/64 |
| 4,801,647 A | 1/1989 | Wolfe, Jr. | 525/74 |
| 4,835,204 A | 5/1989 | Carfagnini | 524/291 |
| 4,839,425 A | 6/1989 | Mawateri et al. | 525/92 |
| 4,879,328 A | 11/1989 | Karasawa et al. | 524/109 |
| 4,883,837 A | 11/1989 | Zabrocki | 525/66 |
| 4,916,208 A | 4/1990 | Klingensmith | 528/392 |
| 4,950,541 A | 8/1990 | Tabor et al. | 428/373 |
| 4,956,501 A | 9/1990 | Sunseri et al. | 525/64 |
| 5,026,798 A | 6/1991 | Canich | 526/127 |
| 5,037,888 A | 8/1991 | Vanderbilt | 55/108 |
| 5,055,438 A | 10/1991 | Canich | 502/117 |
| 5,057,553 A | * 10/1991 | Zagefka et al. | 525/327.7 |
| 5,089,321 A | 2/1992 | Chum et al. | 428/218 |
| 5,169,899 A | 12/1992 | Uehara et al. | 525/66 |
| 5,183,860 A | 2/1993 | Kashihara | 525/398 |
| 5,194,509 A | 3/1993 | Hasenbein et al. | 525/285 |
| 5,262,075 A | * 11/1993 | Chung et al. | 525/327.7 |
| 5,272,236 A | 12/1993 | Lai et al. | 426/348.5 |
| 5,278,272 A | 1/1994 | Lai et al. | 526/348.5 |
| 5,342,887 A | 8/1994 | Bergstrom et al. | 525/108 |
| 5,346,963 A | 9/1994 | Hughes et al. | 525/285 |
| 5,369,186 A | 11/1994 | Galimberti et al. | 525/330.7 |
| 5,371,442 A | 12/1994 | Nishikubo et al. | 525/67 |
| 5,412,038 A | 5/1995 | Murray et al. | 525/303 |
| 5,536,788 A | * 7/1996 | Deckers et al. | 525/327.6 |

FOREIGN PATENT DOCUMENTS

| | | |
|---|---|---|
| EP | 0 186 060 | 7/1986 |
| EP | 0 385 918 | 9/1990 |
| EP | 0 407 098 A2 | 1/1991 |
| FR | 2 135 098 | 12/1972 |
| GB | 1 131 010 | 10/1968 |
| GB | 2 007 683 | 5/1979 |
| GB | 2 188 053 | 9/1987 |
| WO | 93/20144 | 10/1993 |

OTHER PUBLICATIONS

Coran, A.Y., "Thermoplastic Elastomers Based on Elastomer–Thermoplastic Blends Dynamically Vulcanized", *Thermoplastic Elastomer: A Comprehensive Review*, Chapter 7 (1987).

Legge, N.R., "Thermoplastic Elastomers—The Future", *Elastomerics* P. 19, Oct. 1985.

* cited by examiner

*Primary Examiner*—Bernhard Lipman

(57) ABSTRACT

At least partially vulcanized elastomers are described, these elastomers obtained by at least partially crosslinking (1) an elastomeric polymer containing reactive substituents with (2) a crosslinking agent (a) containing two or more reactive substituents differing from those contained in the elastomeric polymer, and (b) having a number average molecular weight less than about 2000, each of the reactive substituents selected (i) such that those of the elastomer will react with those of the crosslinking agent to at least partially crosslink the elastomer, and (ii) from the group consisting of carboxylic acid, carboxylic anhydride, carboxylic acid salt, carbonyl halide, hydroxy, epoxy, and isocyanate.

18 Claims, 1 Drawing Sheet

CROSSLINKED ELASTOMERS PROCESSES FOR THEIR MANUFACTURE AND ARTICLES MADE FROM THESE ELASTOMERS

This application is a continuation-in-part of application Ser. No. 08/628,909, filed Jul. 12, 1996, now abandoned.

BACKGROUND OF INVENTION

1. Field of the Invention

This invention relates to crosslinked elastomers, and processes for making and products made from such elastomers. In one aspect, this invention relates to elastomers crosslinked with a compound other than sulfur or a peroxide while in another aspect, the invention relates to crosslinking functionalized elastomers.

2. Description of the Related Art

Traditionally, elastomers have been crosslinked (also known as vulcanized) using either (i) a free radical curing system initiated by radiation or a peroxide, or (ii) sulfur, but the resulting products have often been unsatisfactory for one or more of several reasons. For example, low molecular weight by-products (which can have detrimental effects on the physical properties of the crosslinked elastomer) are often produced with free radical curing systems, and sulfur-crosslinked elastomers can have odor and color problems as well as less than desirable heat aging stability and weatherability characteristics due to unsaturation in the polymer chain and/or weak sulfur linkages. Alternative crosslinking systems have been proposed, e.g. U.S. Pat. 4,801,647 discloses crosslinking an ethylene-propylene-diene elastomer grafted with maleic anhydride with diamine crosslinking agents, but the development of other elastomer crosslinking systems are still of interest to many end-users of elastomers.

SUMMARY OF THE INVENTION

According to this invention, an at least partially crosslinked elastomer comprises the reaction product of (i) an elastomeric polymer containing reactive substituents, and (ii) a crosslinking agent (also known as a vulcanizing agent) (a) containing two or more reactive substituents differing from those contained in the elastomeric polymer, and (b) having a number average molecular weight of less than about 2000, each of the reactive substituents selected such that those of the elastomer will react with those of the crosslinking agent to at least partially crosslink the elastomer, and each of the reactive substituents selected from the group consisting of carboxylic acid, carboxylic anhydride, carboxylic acid salt, carbonyl halide, hydroxy, epoxy, and isocyanate.

In another aspect of this invention, the at least partially crosslinked elastomer is prepared by a process comprising reacting by contacting (i) an elastomeric polymer containing reactive substituents, and (ii) a crosslinking agent (a) containing two or more reactive substituents differing from those contained in the elastomeric polymer, and (b) having a number average molecular weight of less than about 2000, each of the reactive substituents selected such that those of the elastomer will react with those of the crosslinking agent to at least partially crosslink the elastomer and each of the reactive substituents selected from the group consisting of carboxylic acid, carboxylic anhydride, carboxylic acid salt, carbonyl halide, hydroxy, epoxy, and isocyanate.

The present invention also includes articles comprising at least one of the at least partially crosslinked elastomers of this invention, and the shaping of these articles, preferably in a melt processing operation.

DETAILED DESCRIPTION OF THE INVENTION

Figure 1:
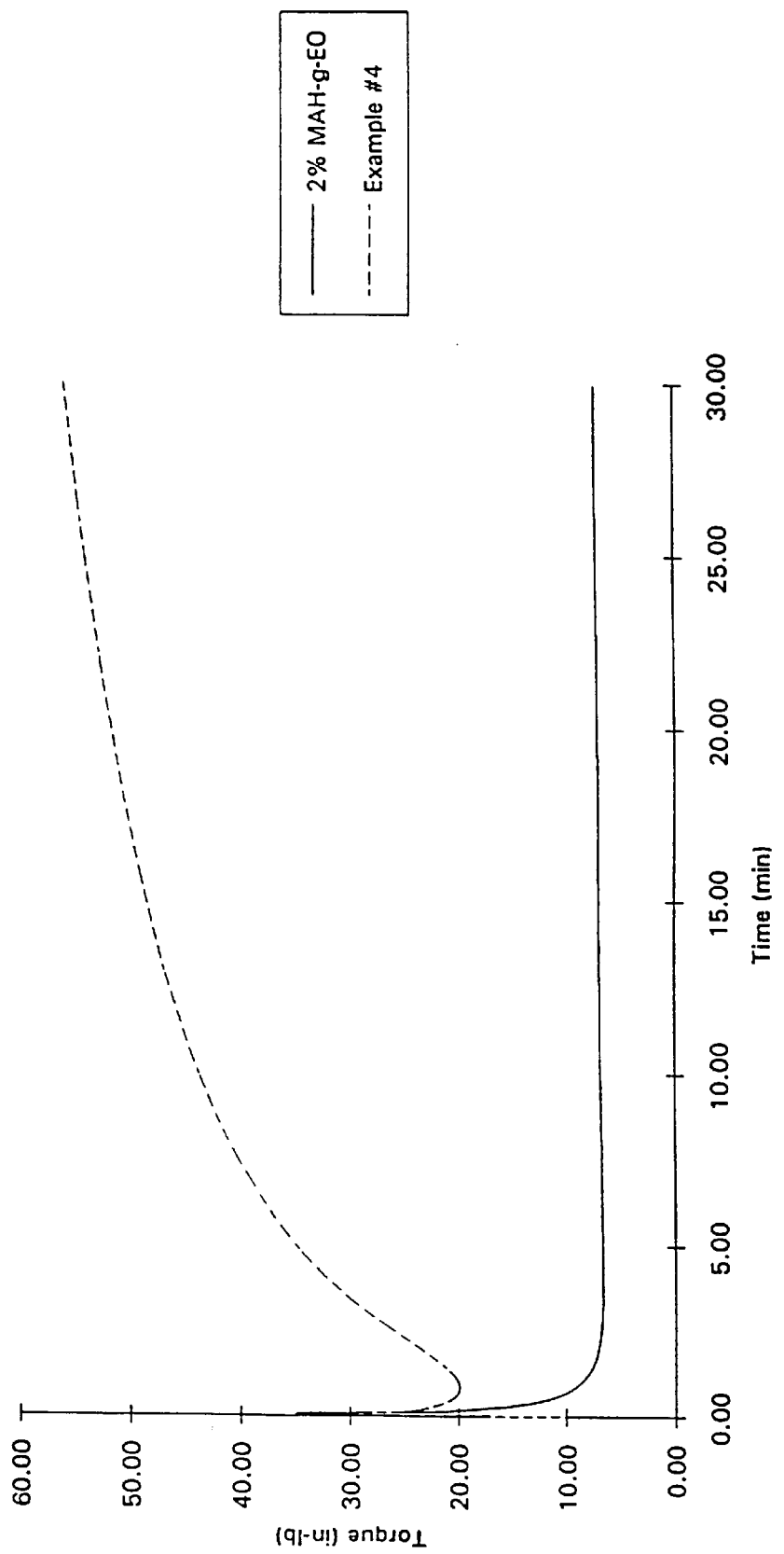
FIG. 1 shows Monsanto ODR torque versus time plots for two different polymer melt compositions mixed with a Rheomix 600 mixer at 60 rpm at 110 C The solid plot line represents a melt composition comprising ethylene 1-octene elastomeric polymer grafted with 2 wt. % maleic anhydride (MAH) and Irganox™ B900 antioxidant, and the interrupted plot line represents the same melt composition with 6.4 wt. % glycidyl ether of bisphenol A having an epoxide equivalent of 176–183 (DER 383 commercially available from The Dow Chemical Co.) as described in Example 4 of this invention.

"Polymer" means a large molecule made from a number of repeating units termed monomers. "Homopolymer" means a polymer made from one kind of monomer. "Interpolymer" means a polymer made from two or more kinds of monomers, and includes "copolymers" which are made from two kinds of monomers, "terpolymers" which are made from three kinds of monomers, and the like.

"Elastomeric polymer" means a polymer that can be stretched with the application of stress to at least twice its length and after release of the stress, returns to its approximate original dimensions and shape. The elastic recovery of an elastomeric polymer prior to vulcanization is generally at least 40%, preferably at least 60%, and more preferably at least 80% when measured according to ASTM D-412.

Suitable elastomeric polymers for use in this invention include ethylene/α-olefin interpolymers; isoprene rubbers such as polyisoprene (including natural rubber) and isobutylene/isoprene rubber (butyl rubber); polychloroprene; and butadiene rubbers such as polybutadiene, styrene/butadiene rubber, and acrylonitrile/butadiene rubber. "α-Olefin" means a hydrocarbon molecule or a substituted hydrocarbon molecule (i.e. a hydrocarbon molecule comprising one or more atoms other than hydrogen and carbon, e.g. halogen, oxygen, nitrogen, etc.), the hydrocarbon molecule comprising (i) only one ethylenic unsaturation, this unsaturation located between the first and second carbon atoms, and (ii) at least 3 carbon atoms, preferably of 3 to 20 carbon atoms, in some cases preferably of 4 to 10 carbon atoms and in other cases preferably of 4 to 8 carbon atoms. Examples of preferred α-olefins from which the elastomers used in this invention are prepared include propylene, 1-butene, 1-pentene, 1-hexene, 1-octene, 1-dodecene, and mixtures of two or more of these monomers.

Preferred among the elastomeric polymers useful in the practice of this invention are the ethylene/α-olefin interpolymers, particularly those having a density less than about 0.9 g/cm$^3$. Preferred ethylene interpolymers include ethylene/α-olefin copolymers; ethylene/α-olefin/diene terpolymers; and interpolymers of ethylene and one or more other monomers which are copolymerizable with ethylene, such as ethylenically unsaturated carboxylic acids (both mono- and difunctional) and their corresponding esters and anhydrides, e.g. acrylic acid, methacrylic acid, vinyl ester (e.g., vinyl acetate) and maleic anhydride, and vinyl group-containing aromatic monomers such as styrene. Included among these polymers are (i) heterogeneous linear low density ethylene interpolymers (heterogeneous LLDPE) made using Ziegler-Natta catalysts in a slurry, gas phase, solution or high pressure process, such as described in U.S. Pat. No. 4,076,698, and (ii) homogeneous linear ethylene polymers such as (a) those described in U.S. Pat. No. 3,645,992, and (b) those made using the so-called single site catalysts in a batch reactor having relatively high olefin concentrations as described, for example, in U.S. Pat. No. 5,026,798 and U.S. Pat. No. 5,055,438. Such polymers are commercially available. Representative of commercially available homogeneous linear ethylene polymers are TAFMER™ made by Mitsui Petrochemical Industries, Ltd. and EXACT™ made by Exxon Chemical Co. Each of the U.S. patents cited in this paragraph are incorporated herein by reference.

Especially preferred ethylene/α-olefin interpolymers are ethylene/1-octene, ethylene/1-hexene, ethylene/1-butene and ethylene/propylene copolymers produced via a constrained geometry single site catalyst. A process for making such copolymers is described in U.S. Pat. No. 5,272,236 and U.S. Pat. No. 5,278,272, both of which are incorporated by reference. Such ethylene interpolymers are preferably substantially linear olefin polymers having long chain branching. Substantially linear olefin polymers can be made by gas phase, solution phase, high pressure or slurry polymerization. These polymers are preferably made by solution polymerization. Substantially linear ethylene polymers (SLEP's) are commercially available from The Dow Chemical Co. under the trademark AFFINITY and from DuPont Dow Elastomers L.L.C. under the trademark ENGAGE.

"Substantially linear polymer" means that the polymer backbone contains long chain branching and is substituted with an average of up to 3 long chain branches/1000 carbons. Preferred substantially linear polymers are substituted with about 0.01 to about 3 long chain branches/1000 carbons, more preferably from about 0.01 to about 1 long chain branches/1000 carbons, and especially from about 0.3 to about 1 long chain branches/1000 carbons. These substantially linear polymers are characterized by.

a) a melt flow ratio, $I_{10}/I_2$, $\geq 5.63$, b) a molecular weight distribution, $M_w/M_n$, defined by the equation:

$$M_w/M_n \leq (I_{10}/I_2) - 4.63,$$

and c) a critical shear stress at onset of gross melt fracture of greater than about $4 \times 10^6$ dyne/cm$^2$.

"Long chain branching" means a pendant carbon chain having a chain length of at least 6 carbons, above which the length cannot be distinguished using $^{13}$C nuclear magnetic resonance spectroscopy. The long chain branch can be as long as about the length of the polymer backbone to which it is attached.

The presence of long chain branching can be determined in ethylene homopolymers by using $^{13}$C nuclear magnetic resonance (NMR) spectroscopy and is quantified using the method of Randall (*Rev. Macromol. Chem. Phys.*, C29 (2&3), p. 285–297). However as a practical matter, current $^{13}$C nuclear magnetic resonance spectroscopy cannot determine the length of a long chain branch in excess of six carbon atoms. For ethylene-α-olefin copolymers, the long chain branch is longer than the short chain branch that results from the incorporation of the α-olefin(s) into the polymer backbone. For example, a substantially linear ethylene/1-octene copolymer has a short chain branch length of six (6) carbons, but a long chain branch length of at least seven (7) carbons.

The SLEP's preferably comprise from about 95 to 50 weight percent (wt. %) ethylene, and from about 5 to 50 wt % of at least one α-olefin comonomer, more preferably from 10 to 35 wt % of at least one α-olefin comonomer. The comonomer content is measured using infrared spectroscopy according to ASTM D-2238, Method B. Typically, the SLEP's are copolymers of ethylene and an α-olefin of 3 to about 20 carbon atoms (e.g., propylene, 1-butene, 1-hexene, 4-methyl-1-pentene, 1-heptene, 1-octene, styrene, etc.), preferably of 3 to about 10 carbon atoms, and more preferably these polymers are a copolymer of ethylene and 1-octene. The density of these substantially linear ethylene polymers is preferably in the range from about 0.85 to about 0.9, more preferably from about 0.85 to about 0.88, grams per cubic centimeter (g/cm$^3$) determined by ASTM D-792. The melt flow ratio, measured as $I_{10}/I_2$ as defined in ASTM D-1238, Conditions 190C/10 kg and 190C/2.16 kg (formerly known as "Conditions (N) and (E)", respectively and also known as $I_{10}$ and $I_2$, respectively), is greater than or equal to 5.63, and is preferably in the range from about 6.5 to 15, more preferably in the range from about 7 to 10. The molecular weight distribution ($M_w/M_n$), measured by gel permeation chromatography (GPC), is preferably in the range from about 1.5 to 2.5. For substantially linear ethylene polymers, the $I_{10}/I_2$ ratio indicates the degree of long-chain branching, i.e. the larger the $I_{10}/I_2$ ratio, the more long-chain branching in the polymer.

A unique characteristic of the homogeneously branched, substantially linear ethylene polymers is the highly unexpected flow property where the $I_{10}/I_2$ value of the polymer is essentially independent of the polydispersity index (i.e., $M_w/M_n$) of the polymer. This is contrasted with conventional linear homogeneously branched and linear heterogeneously branched polyethylene resins having rheological properties such that to increase the $I_{10}/I_2$ value the polydispersity index must also be increased.

Substantially linear olefin polymers have a critical shear rate at onset of surface melt fracture of at least 50 percent greater than the critical shear rate at the onset of surface melt fracture of a linear olefin polymer having about the same $I_2$, $M_w/M_n$, and density. By "about the same" is meant that each value is within 10 percent of the comparative value.

The preferred melt index, measured as $I_2$ (ASTM D-1238, condition 190/2.16 (formerly condition E)), is from about 0.1 g/10 min to 200 g/10 min, more preferably 0.1 to 20 g/10 min. Typically, the preferred SLEP's used in the practice of this invention are homogeneously branched and do not have any measurable high density fraction, i.e., short chain branching distribution as measured by Temperature Rising Elution Fractionation described in U.S. Pat. No. 5,089,321, which is incorporated herein by reference. Stated in another manner, these polymers do not contain any polymer fraction that has a degree of branching less than or equal to 2 methyl groups/1000 carbons. These preferred SLEP's also have a single differential scanning calorimetry (DSC) melting peak between –30 C and 150 C using a second heat at a canning rate of 10 C/minute.

Ethylene/α-olefin/diene terpolymers may also be used in the practice of this invention. Suitable α-olefins include the α-olefins described above as suitable for making ethylene α-olefin copolymers. The dienes suitable as monomers for preparation of such terpolymers are either conjugated or nonconjugated, typically nonconjugated dienes having from 6 to 15 carbon atoms. Representative examples of suitable nonconjugated dienes that may be used to prepare the terpolymer include:

a) Straight chain acyclic dienes such as 1,4-hexadiene, 1,5-heptadiene, and 1,6-octadiene;

b) branched chain acyclic dienes such as 5-methyl-1,4-hexadiene, 3,7-dimethyl-1,6-octadiene, and 3,7-dimethyl-1,7-octadiene;

c) single ring alicyclic dienes such as 4-vinylcyclohexene, 1-allyl-4-isopropylidene cyclohexane, 3-allylcyclopentene, 4-allylcyclohexene, and 1-isopropenyl-4-butenylcyclohexane;

d) multi-ring alicyclic fused and bridged ring dienes such as dicyclopentadiene; alkenyl, alkylidene, cycloalkenyl and cycloalkylidene norbornenes such as 5-methylene-2-norbornene, 5-methylene-6-methyl-2-norbornene, 5-methylene-6,6-dimethyl-2-norbornene, 5-propenyl-2-norbornene, 5-(3-cyclopentenyl)-2-norbornene, 5-ethylidene-2-norbornene, and 5-cyclohexylidene-2-norbornene; and the like.

The preferred dienes are selected from the group consisting of 1,4-hexadiene, dicyclopentadiene, 5-ethylidene-2-norbornene, 5-methylene-2-norbornene, 7-methyl-1,6-octadiene, piperylene; 4-vinylcyclohexene, etc.

The preferred terpolymers for the practice of the invention are terpolymers of ethylene, propylene and a nonconjugated diene (EPDM). Such terpolymers are or will be commercially available from such companies as DuPont Dow Elastomers L.L.C.

The total diene monomer content in the terpolymer may suitably range from about 0.1 to about 15 weight percent, preferably 0.5 to about 12 weight percent, and most preferably about 1.0 to about 6.0 weight.

Both the ethylene copolymers and the ethylene terpolymers comprise from about 20 to about 90 wt. %, preferably from about 30 to about 85 wt. %, ethylene with the other comonomers comprising the balance. The ethylene copolymers and terpolymers preferably have a weight average molecular weight ($M_w$) of at least about 10,000, and more preferably at least about 15,000, and may have a $M_w$ of up to about 1,000,000 or higher, preferably up to about 500,000.

The elastomeric polymer is preferably substantially amorphous. The expression "substantially amorphous" means that the polymer has a degree of crystallinity less than about 25%. The elastomeric polymer more preferably has a crystallinity less than about 15%.

The elastomeric polymer may be the product of a single polymerization reaction or may be a polymer blend resulting from physical blending of polymers obtained from different polymerization reactions and/or resulting from using a mixed polymerization catalyst.

"Functionalized elastomeric polymer" means an elastomeric polymer or elastomeric polymer blend that comprises at least one reactive substituent that will react with the reactive substituents of the crosslinking agent to at least partially vulcanize the elastomer. Preferred reactive elastomer substituents are selected from the group consisting of carboxylic acid, carboxylic anhydride, carboxylic acid salt, carbonyl halide, hydroxy, epoxy, and isocyanate.

A preferred functionality-imparting compound for the elastomeric substituent has ethylenic unsaturation to permit integration of that compound with the functionality intact into the elastomeric polymer either as a graft or as a comonomer. The preferred compound may be represented by the formula:

$$R^1X_m(R^2)_n \tag{1}$$

in which $R^1$ represents an ethylenically unsaturated predominantly hydrocarbyl (or hydrocarbylene) group (referred to hereafter as "hydrocarbyl(ene)"), each X may be the same or different and represents a reactive moiety selected from carboxylic acid, carboxylic anhydride, carboxylic salt, carbonyl halide, hydroxy, epoxy and isocyanate, $R^2$ represents a predominantly hydrocarbyl(ene) group, m represents an integer which is greater than or equal to 1, and n represents an integer greater than or equal to 0. Preferably m is in the range from 1 to 4, more preferably 1 or 2, and n is preferably 0. When grafted onto the elastomeric polymer, this compound preferably has just one ethylenic unsaturation per molecule.

Preferred unsaturated, predominantly hydrocarbyl(ene) compounds may be represented either by the formula $$R^3-(R^4X)_y-CH=CH-(R^4X)_z-R^3 \tag{II}$$

in which $R^3$ represents H or a predominantly hydrocarbyl group, $R^4$ represents a predominantly hydrocarbylene group, X is as defined above, y is an integer from 0 to 4, z is an integer from 0 to 4, and y+z>0, preferably $\leq 2$, or by the formula

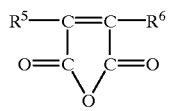

(III)

in which $R^5$ and $R^6$ are independently hydrogen or a $C_1$–$C_{20}$ alkyl, and one can join with the other to form an alicyclic structure.

The predominantly hydrocarbyl(ene) group is a hydrocarbyl or hydrocarbylene group preferably having from 2 to about 30 carbon atoms and more preferably having from 2 to about 12 carbon atoms, and having not more than 50 mol %, preferably not more than 20 mol %, more preferably not more than 1 mol %, hetero-atoms (excluding the hetero atoms which comprise the reactive groups). The predominantly hydrocarbyl(ene) group may be straight or branched aliphatic, optionally having one or more hetero atoms in the carbon chain and preferably alkyl or alkylene, which preferably has from 2 to 30, more preferably from 2 to 12, carbon atoms; aromatic, optionally having one or more hetero-atoms as ring members and preferably having 6 ring members, more preferably phenyl or phenylene; cycloaliphatic optionally having one or more hetero-atoms as ring members and preferably having 5 to 10 ring members; fused polycyclic ring systems containing one or more of the aforementioned aromatic and/or aliphatic rings and compounds which combine two or more of the aforementioned aliphatic, aromatic, cycloaliphatic and fused polycyclic ring moieties.

Examples of preferred ethylenically unsaturated predominantly hydrocarbyl(ene) compounds include vinyl and vinylene, particularly cis-vinylene, and predominantly hydrocarbyl compounds having these groups such α-olefins, norbornene, allyl, styrene, dienes, etc. Suitable α-olefins include the α-olefins described above as suitable for making ethylene/α-olefin copolymers. Suitable dienes include those described above as suitable monomers for the preparation of terpolymers.

Unsaturated predominantly hydrocarbyl(ene) compounds having at least one reactive group include unsaturated compounds having at least one carboxylic functionality, including carboxylic acids, carboxylic anhydrides, and salts of carboxylic acids. The cations of the carboxylic acid salts may be any metal or nonmetal cation, but preferably is a metal ion of Group IA or IIA of the Periodic Table of the Elements as printed in the 71st Edition of the CRC Handbook of Chemistry and Physics at page 1–10 (1990–1991), e.g. sodium, potassium, calcium, etc. Preferably, these unsaturated predominantly hydrocarbyl compounds have one or two carboxylic functionalities. Representative examples of unsaturated predominantly hydrocarbyl compounds having carboxylic functionality include acrylic, methacrylic, itaconic, crotonic, α-methyl crotonic, citraconic, succinic, phthalic, tetrahydrophthalic, and cinnamic acids, and their anhydride, ester and salt derivatives, if any. These compounds are commercially available or can be derived from commercially available compounds via procedures well known in the art.

The acid anhydride group-containing unsaturated compounds are preferred. Representative examples of the acid anhydride group-containing unsaturated compounds include maleic anhydride, itaconic anhydride, chloromaleic anhydride, citraconic anhydride, butenyl-succinic anhydride, tetrahydrophthalic anhydride, etc. Maleic anhydride is particularly preferred.

Unsaturated compounds having at least one reactive group also include unsaturated compounds having at least one carbonyl halide functionality, which are sometimes also referred to as Friedel-Crafts acylating agents, in which the halide may be fluoride, chloride, bromide or iodide, preferably chloride. Included among these compounds are predominantly hydrocarbyl carbonyl halides having at least one vinyl unsaturation and having one or more carbonyl halide substituents. These compounds are either commercially available or can be derived from the corresponding predominantly hydrocarbyl carboxylic acids described above by procedures well known in the art. Representative examples of the carbonyl halide containing unsaturated compounds include the acryloyl, methacryloyl, maleoyl, itaconoyl, citraconoyl, tetrahydrophthaloyl, and cinnamoyl halides. Acryloyl chloride, methacryloyl chloride, and maleoyl chloride are preferred.

The hydroxy group containing unsaturated compound is a compound having an hydroxy group and an unsaturation which is copolymerizable with an ethylenically unsaturated compound. Illustrative hydroxy group containing compounds are 3-hydroxy-1-propene, 4-hydroxy-1-butene, 6-hydroxy-1-hexene and 8-hydroxy-1-octene.

The epoxy group-containing unsaturated compound is a compound having an epoxy group and an unsaturation which is copolymerizable with an olefin or ethylenically unsaturated compound. The epoxy group-containing unsaturated compounds include, for example, unsaturated glycidyl esters, unsaturated glycidyl ethers, epoxyalkylenes, p-glycidyl-styrenes and the like. These may be represented by the following formulae (IV), (V), and (VI):

$$R^7-\overset{O}{\overset{\|}{C}}-O-CH_2-\underset{O}{CH-CHR^2} \quad (IV)$$

wherein $R^7$ is a $C_{2-18}$ hydrocarbon group having an ethylenic unsaturation;

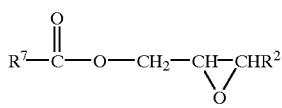

(V)

wherein $R^7$ is as defined above and X is

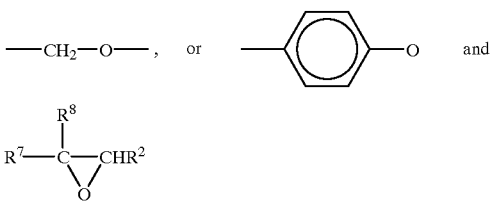

wherein $R^7$ and $R^2$ are as defined above and $R^8$ is a hydrogen atom or a methyl group.

Specific examples of the epoxy group-containing unsaturated compound include glycidyl acrylate, glycidyl methacrylate, glycidyl itaconate, glycidyl butenate, allyl glycidyl ether, 2-methylallyl glycidyl ether, styrene-p-glycidyl ether, 3,4-epoxybutene, 3,4-epoxy-3-methyl-1-butene, 3,4-epoxy-1-pentene, 3,4-epoxy-3-methylpentene, 5,6-epoxy-i-hexene, vinylcyclohexene monoxide, p-glycidylstyrene, etc.

Unsaturated predominantly hydrocarbyl(ene) compounds having at least one reactive group further include unsaturated compounds having at least one isocyanate group. Preferred among these compounds are those in which the unsaturated predominantly hydrocarbyl(ene) moiety is an unsaturated aliphatic group, more preferably an α-unsaturated alkyl group having from 2 to 22 carbon atoms. Representative examples of such compounds include vinyl isocyanate; α-olefin isocyanates having from 3 to 8 carbon atoms in the α-olefin, such as 3-isocyanato-1-propene, 4-isocyanato-1-butene, 6-isocyanato-1-hexene, and 8-isocyanato-1-octene; isocyanato ethyl acrylate and isocyanato methacrylate.

The unsaturated compounds having at least one reactive group can include compounds having combinations of different reactive groups as long as they do not react with each other under polymer melt processing conditions such that they are not available to react with reactive substituents of the crosslinking compound. Suitable combinations include any combination of two or more carbonyl functionalities, such as the combination of carboxylic acid and carboxylic anhydride or the combination of carboxylic acid and hydroxy.

The above-described unsaturated compounds having reactive groups may be used alone, or two or more can be used in combination with one another.

The amount of the unsaturated compound having reactive substituents used to functionalize the elastomeric polymer is preferably sufficient to provide at least two functional groups per elastomeric polymer chain or sufficient functionality to permit the functionalized elastomeric polymer to crosslink beyond the gel point given sufficient crosslinking agent and more preferably sufficient to achieve commercially acceptable compression set and other rubber properties. This amount is generally at least 0.01 wt %, preferably at least 0.1 wt %, and more preferably at least 1 wt %, unsaturated compound up to an amount varied by convenience, preferably up to 20 wt %, more preferably up to 10 wt %, unsaturated compound based on the total weight of the elastomeric polymer. These unsaturated compounds are incorporated into the elastomeric polymer either by adding these compounds as a comonomer during preparation of the elastomeric polymer as described, for example, in U.S. Pat. No. 4,839,425, which is incorporated herein by reference as if fully set forth herein, or by post-polymerization grafting onto the elastomeric polymer. Post-polymerization grafting is preferred.

The unsaturated organic compound can be grafted to the elastomeric polymer by any known technique, such as one of those taught in U.S. Pat. No. 3,236,917 and U.S. Pat. No. 5,194,509 which are incorporated into and made a part of this application by reference. For example, in the '917 patent the polymer is introduced into a two-roll mixer and mixed at a temperature of 60 C. The unsaturated organic compound is then added along with a free radical initiator, such as, for example, benzoyl peroxide, and the components are mixed at 30 C until the grafting is completed. In the '509 patent, the procedure is similar except that the reaction temperature is higher, e.g., 210 to 300 C, and a free radical initiator is not used at a reduced concentration.

An alternative and preferred method of grafting is taught in U.S. Pat. No. 4,950,541, the disclosure of which is incorporated into and made a part of this application by reference, by using a twin-screw devolatilizing extruder as the mixing apparatus. For example, an elastomeric polymer and unsaturated functionality-imparting organic compound are mixed and reacted within the extruder at temperatures at which the reactants are molten and in the presence of a free radical initiator. Preferably, the unsaturated functionality-imparting organic compound is injected into a zone maintained under pressure within the extruder.

Methods for preparing functionalized elastomeric polymer by grafting the functionality onto ethylene/propylene copolymer elastomer are also disclosed in U.S. Pat. No. 4,134,927 which is incorporated herein by reference.

Preferably, the functionalized elastomeric polymer is soft and elastomeric in nature (e.g., having a low tensile yield, preferably below 400 psi).

The functionalized elastomeric polymer need not be a single rubber but may also be a blend of one or more functionalized elastomeric polymers. It may also include nonelastomeric polymers, either as impurities or as reinforcers at up to 100 parts per 100 parts functionalized elastomeric polymer.

The crosslinking agent contains at least two (2) reactive substituents selected such that these cross-linking substituents will react with those of the elastomeric substituent to at least partially vulcanize the elastomer. As expected, the reaction produces covalent bonds between the functionalities of the functionalized elastomeric polymer and the reactive substituents of the crosslinking agent to form a covalently crosslinked elastomeric polymer. When the reactive substituent of the elastomeric polymer is an epoxy, then the crosslinking agents are selected from the group consisting of carboxylic acid, carboxylic anhydride, carboxylic acid salt, carbonyl halide, hydroxy and isocyanate. When the reactive substituent of the elastomeric polymer is carboxylic anhydride, then the crosslinking agents are selected from the group consisting of hydroxy, epoxy and isocyanate. The elastomeric polymer having covalent crosslinking has better compression strength than a corresponding elastomeric polymer having ionic crosslinking.

Especially preferred crosslinking agents may be defined by the formula $$R^2_p X_q \tag{VII}$$

wherein $R^2$ represents a predominantly hydrocarbyl group as defined above, X represents the reactive functionality as defined above, p is an integer $\geq 0$, more preferably 1, and q is an integer $\geq 2$, more preferably 2 to 4 and even more preferably 2. These may be represented by the formula $$X-(R^2)_p-X \tag{VIII}$$

in which $R^2$ is as defined above and is preferably an aliphatic group, more preferably an alkylene group, having from 1 to 12 carbon atoms; an aromatic group, preferably phenyl; or an aliphatic aromatic group such as toluene or methylene diphenyl X is as defined above.

Representative examples of crosslinking agents having at least one reactive group include dicarboxylic functionalities such as oxalic, malonic, succinic, adipic, suberic, phthalic, isophthalic, terephthalic, hexahydrophthalic, toluic, pyromellitic, etc., acids, esters, salts and anhydrides, if possible, such as phthalic anhydride, pyromellitic anhydride, hexahydrophthalic anhydride, and succinic anhydride; acyl halides of the aforementioned dicarboxylic functionalities; aliphatic diisocyanates such as methyl diisocyanate, ethyl diisocyanate, propyl diisocyanate, and the like; aromatic diisocyanates such as phenyl diisocyanate, tolyl diisocyanate, etc.; diol and polyol compounds, such as glycerine, pentaerithritol, polyethylene glycol with two terminal alcohol's, ethylene glycol, propanediol, butanediol, glucose, sucrose, 1,4-benzenedimethanol, etc.; epoxy compounds such as epoxidized soybean oil; ether compounds such as bisphenol A diglycidyl ether, glycidyl ether of aliphatic polyol, silico-glycidyl resin, 1,4-butanediol diglycidyl ether, ethylene glycol diglycidyl ether, glycidyl ethers of polynuclear phenols, and glycidyl ether of tris-p-hydroxyphenyl methane, etc.; and isocynate compounds such as methyl diisocyanate, tolyl diisocyanate, hexyl diisocyanate and the like.

The crosslinking agents may be nonpolymeric or polymeric. They preferably have a number average molecular weight less than 2000, more preferably less than 1500, and even more preferably less than 800.

In general, the concentration and reaction conditions will depend on the reactivity of the selected functionalized elastomeric polymer/crosslinking agent pair. Preferably there is an approximate stoichiometric equivalence between the concentration of the crosslinking agent reactive sites and the functionalized elastomeric polymer reactive sites. A small excess of the less reactive component is acceptable, but too large an excess of the crosslinking agent may lead to ineffective network formation during crosslinking.

Optionally, a catalyst may be incorporated to accelerate the crosslinking reaction. Suitable catalysts will be obvious to those skilled in the art. For the preferred composition of maleic anhydride grafted rubber crosslinked with a glycidyl ether (epoxy), a suitable catalyst is an amine such as 2-methyl imidazole.

Many different adjuvants or additives are known to modify elastomer costs and/or properties, and these may be used in the present invention. Nonlimiting examples include fillers such as various carbon blacks, clays, silica, alumina, calcium carbonate; extender oils, e.g. aromatic oils, paraffinic oils or naphthenic oils including aliphatic or napthenic or polyester oils; pigments, such as titanium dioxide; processing aids such as lubricants and waxes; phenolic, thioester and phosphite antioxidants such as Irganox 1010™ (commercially available from Ciba-Geigy) or Weston 619™ (commercially available from General Electric); acid neutralizers such as MgO, calcium stearate, dihydrotalcite, tin mercaptans, and tetrasodium pyrophosphate; and plasticizers such as dialkylphthalates, trialkylmellitates and dialkyladipates. Adjuvants may be added before or after the vulcanization. Generally, amounts from about 5 to 50 parts by weight based, on the total weight of the elastomer(s), of fillers can be used and 10 to 100 parts by weight, based on total weight of the elastomer(s), of compounding ingredients such as processing oils and plasticizers can be used.

The vulcanization process used in the practice of this invention is static vulcanization, e.g. (i) low-temperature mixing of the vulcanizing agent and the functionalized elastomeric polymer, (ii) molding or shaping the resulting mixture, and (iii) heating the molded or shaped mixture to cause at least a partial vulcanization of the mixture. "Low-temperature mixing" means that the vulcanizing agent and the functionalized elastomeric polymer are blended with one another at a combination of temperature and time at which little, if any, vulcanization occurs. Molding or shaping are done at a combination of temperature and time at which little, if any, vulcanization occurs. The molded or shaped mixture is usually heated only to that temperature necessary to effect vulcanization (thus avoiding any unnecessary degradation of either the vulcanizing agent or the functionalized polymer (or any adjuvant that might also be present)). The vulcanization process can be done on a solvent, i.e., mix or dissolve the functionalized elastomer with the crosslinking agent and then evaporate the solvent and cure the mixture at a high temperature.

Crosslinking agent and/or catalyst may be introduced via a concentrate (such as in the elastomer) or as neat materials or as solutions in appropriate solvents. Liquids may be imbibed directly by the functionalized elastomeric polymer and introduced into a mixer or extruder directly in that fashion.

The crosslinked elastomer can be used in many applications such as wire and cable coatings, roofing membranes, floor coverings, gaskets, hoses, boots, automotive parts, weatherstripping, and other parts known to require elastomeric materials.

The following examples are illustrative of the present invention. Unless otherwise specified, all parts, percentages, and ratios are by weight.

EXAMPLES

Materials:

Maleic anhydride grafted ethylene/1-octene copolymer (MAH-g-EO) is prepared by grafting maleic anhydride to ethylene/1-octene copolymer by reactive extrusion. The ethylene/1-octene copolymer used to make the MAH-g-EO is a copolymer made in solution polymerization process from a constrained geometry, single-site catalyst. The final graft copolymer has a melt index of approximately 0.5 g/10 min, density of 0.87 g/cc, and MAH content of 1 wt % (1% MAH-g-EO). A second lot of MAH-g-EO has 1.9 wt % of MAH (2% MAH-g-EO).

Ethylene/1-octene copolymer (EO) is made from single-site catalyst, and has a density of 0.8687 g/cc and melt index (MI) of 0.94 g/10 min. Ethylene/propylene copolymer (EP) is Vistalon™ 707 (commercially available from Exxon) that has a density of 0.872 g/cc and MI of 0.48 g/10 min. Ethylene/propylene 1,4-hexadiene terpolymer is Nordel™ 2722 (commercially available from Dupont Dow Elastomers LLC) that has a density of 0.878 g/cc and MI of 0.1 g/10 min.

Epoxy compound is DER 383 (commercially available from The Dow Chemical Co.). This is a glycidyl ether of bisphenol A having an epoxide equivalent weight of 176–183.

Irganox™ B900 (B900) is an antioxidant mixture of phenolic and phosphite antioxidant commercially available from Ciba-Geigy.

2-Methylimidazole (2-MI) is from Aldrich Chemical Co.

SUNPAR 2280 is an aliphatic extender oil from Sun Oil Co.

Di-Cup™ R dicumyl peroxide from Hercules is used for peroxide cured samples.

Example 1

1% MAH-g-EO (46.6 g) and B900 antioxidant (0.144 g) are melt mixed in a Rheomix 600 mixer at 60 rpm and 110 C for 5 minutes. Following melting of the polymer, epoxy compound (1.5 g, DER 383) is added slowly in about 3 minutes. The mixture is mixed for an additional 4 minutes. The sample is compression molded to a plaque (1/16"×4"×4") at 130 C for 4 min. The sample is cured at 190 C for 23 minutes.

Example 2

1% MAH-g-EO (39.6 g) and oil (7.2 g, SUNPAR 2280) are melt blended for 5 min as described in Example 1. Epoxy compound (1.3 g, DER 383) is added slowly in 3 min., followed by catalyst (0.005 g, 2 MI). The mixture is mixed for an additional 4 minutes. The sample is compression molded to a plaque and cured as described in Example 1.

Example 3

1% MAH-G-EO (46.6 g) is melt mixed in a Rheomix 600 mixer at 60 rpm and 110 C for 5 minutes. Epoxy compound (1.5 g of DER 383) is added slowly in 3 min, followed by catalyst (0.005 g of 2-MI). The mixture is cured and the physical properties are tested as described in Example 1.

Example 4

2% MAH-g-EO (46.6 g) is melt mixed with B900 antioxidant (0.144 g) in a Rheomix 600 mixer at 60 rpm and 130 C for 5 minutes. After the polymer is melted, the temperature is reduced to 110 C. Epoxy compound (3 g, DER 383) is then added slowly over about 3 minutes. The mixture is mixed for additional 4 minutes. The sample is compression molded to a plaque as described in Example 1. The curing rate of the sample is measured by oscillating disk rheometry.

Comparative Examples

The EO, EP, and EPDM samples are cured with peroxide by the following procedure. Each polymer type is melt blended in a Haake Torque Rheometer equipped with a Rheomix 600 mixer. The torque rheometer is operated isothermally at 120 C and at mixing speed of 20 rpm with a heated nitrogen purge in a closed mixer for 20 minutes total mixing time. 4 PHR Di-Cup R dicumyl peroxide is incorporated by weighing into an envelope molded from the base resin of each type. This is added into the polymer melt at the beginning of each run. The molten polymer is removed from the mixer and compression molded at 138 C for 1 minute into 6"×6"×50 mil plaques and then cooled immediately on room temperature water cooled platens. These plaques are each cut into four 3"×3"×50 mil plaques. These smaller plaques are compression molded at 138 C for 2 minutes at 12,000 psi into 6"×6"×20 mil plaques and then cooled as described above. The second molding step is done to remove air bubbles. The 6"×6"×20 mil plaques are each cured at 182 C for 10 minutes in the hot press.

Test Methods:

Vulcanization characteristics of the new elastomer are determined using the Monsanto ODR according to ASTM D 2084. Tensile properties are tested on an Instron Series IX Automated Testing System 1.04. Machine parameters of test are: Sample rate 18.21 pts/sec; Crosshead speed: 2.00 in/min; Full Scale Load Range: 10.00 (lbs); Humidity: 50%; Temperature: 73° F.

Results

The results of Examples 1–3 and the Comparative Examples are shown in the Table below. Those results show that the thermoset elastomer prepared according to this invention has excellent tensile properties. For comparison purposes the tensile properties of two commercial rubbers cured with dicumyl peroxide are also measured. The tensile properties of Examples 1–3 are better than that of the commercially available samples. The crosslinked elastomer of this invention has much less odor in comparison to the peroxide cured systems. Catalyst can be used to accelerate the curing process. Oil can be used to improve the processability, reduce cost, and increase flexibility.

Tensile Properties of Epoxy Cured MAH-g-EO

| System | Stress (psi) | Elongation (%) | Toughness (in-lb/in$^3$) |
| --- | --- | --- | --- |
| Example 1 | 1600 | 760 | 6800 |
| Example 2 | 1100 | 620 | 3800 |
| Example 3 | 1400 | 550 | 4700 |
| EO | 1300 | 800 | 5600 |
| EPDM | 420 | 420 | 2000 |
| EP | 690 | 630 | 2700 |

The results in FIG. 1 show the Monsanto ODR curing rate of the thermosettable elastomers cured according to this invention at 175 C. The results show that epoxy curing agent reacts with an hydride groups of the graft functionalized elastomeric polymer to form crosslinked elastomer as evidenced by the increase in torque vs. curing time. Without the epoxy-graft, the polymer shows no increase in torque after melting.

Although the invention has been described in considerable detail through the preceding specific embodiments, these embodiments are for purposes of illustration only. Many variations and modifications can be made by one skilled in the art without departing from the spirit and scope of the invention.

What is claimed is:

1. An at least partially crosslinked elastomer comprising the reaction product of
  (1) functionalized elastomeric ethylene/ α-olefin interpolymer containing reactive substituents with
  (2) a crosslinking agent
    (a) containing two or more reactive substituents differing from those contained in the functionalized elastomeric polymer, and
    (b) having a number average molecular weight less than about 2000, the α-olefin containing from 4 to 10 carbon atoms when the elastomeric interpolymer is an ethylene/α-olefin/diene terpolymer, each of the reactive substituents selected such that
      (i) those of the functionalized elastomeric interpolymer will react with those of the crosslinking agent to form covalent bonds which at least partially vulcanize the functionalized elastomeric interpolymer, and
      (ii) each of the reactive substituents is selected from the group consisting of carboxylic acid, carboxylic anhydride, carboxylic acid salt, carbonyl halide, hydroxy, epoxy, and isocyanate,
    provided that the reactive substituents of the functionalized elastomeric interpolymer are selected from the group consisting of carboxylic acid, carboxylic anhydride, carboxylic acid salt, carbonyl halide, hydroxy, and epoxy,
  wherein the reaction is a static vulcanization.

2. The at least partially crosslinked elastomer of claim 1 in which the α-olefin comprises 1-octene units.

3. The at least partially crosslinked elastomer of claim 1 in which the functionalized elastomeric interpolymer has a density less than about 0.9 g/cm$^3$.

4. The at least partially crosslinked elastomer of claim 3 in which the functionalized elastomeric interpolymer selected from the group consisting of ethylene/α-olefin copolymers and ethylene/α-olefin/diene terpolymers.

5. The at least partially crosslinked elastomer of claim 4 in which the functionalized elastomeric interpolymer contains long chain branching.

6. The at least partially crosslinked elastomer of claim 5 in which the functionalized elastomeric interpolymer is a functionalized ethylene/α-olefin copolymer.

7. The at least partially crosslinked elastomer of claim 1 in which the functionalized elastomeric interpolymer comprises a functionality derived from a compound of formula

$$R^1X_m(R^2)_n \qquad (I)$$

in which R$^1$ represents an ethylenically unsaturated predominantly hydrocarbyl or hydrocarbylene group, each X may be the same or different and represents a reactive moiety reselected from carboxylic acid, carboxylic anhydride, carboxylic salt, carbonyl halide, hydroxy, and epoxy, R$^2$ represents a predominantly hydrocarbyl group, m represents an integer which is greater than or equal to 1, and n represents an integer greater than or equal to 0.

8. The at least partially crosslinked elastomer of claim 7 in which the compound of formula I is maleic anhydride.

9. The at least partially crosslinked elastomer of claim 1 in which the crosslinking agent is of the formula

$$R^2_pX_q \qquad (VII)$$

in which each R$^2$ is independently a predominantly hydrocarbyl(ene) group, each X is independently a reactive moiety selected from carboxylic acid, carboxylic anhydride, carboxylic salt, carbonyl halide, hydroxy, epoxy and isocyanate, p is an integer greater than or equal to 1, and q is an integer greater than or equal to 2.

10. An article comprising a crosslinked elastomer obtainable from the at least partially crosslinked elastomer of claim 1.

11. The at least partially crosslinked elastomer of claim 1 wherein at least one of the reactive substituents is selected from the group consisting of epoxy and isocyanate.

12. The at least partially crosslinked elastomer of claim 1 wherein the crosslinking agent contains two or more epoxy substituents.

13. The at least partially crosslinked elastomer of claim 12 wherein the reactive substituents of the functionalized elastomeric interpolymer comprise carboxylic anhydride.

14. The at least partially crosslinked elastomer of claim 13 wherein the functionalized elastomeric polymer is functionalized ethylene/α-olefin copolymer.

15. The at least partially crosslinked elastomer of claim 9 wherein the elastomeric polymer containing reactive substituents is a substantially linear ethylene/1-octene copolymer containing two or more maleic anhydride substituents and at least two X of formula (VII) is an epoxy moiety.

16. An article comprising a crosslinked elastomer obtainable from the at least partially crosslinked elastomer of claim 15.

17. The at least partially crosslinked elastomer of claim 4 in which the functionalized elastomeric interpolymer is functionalized ethylene/propylene (EPM) copolymer.

18. The at least partially crosslinked elastomer of claim 14 in which the functionalized elastomer interpolymer is functionalized ethylene/propylene (EPM) copolymer.

* * * * *

UNITED STATES PATENT AND TRADEMARK OFFICE
CERTIFICATE OF CORRECTION

PATENT NO.    : 6,384,139 B1
DATED         : May 7, 2002
INVENTOR(S)   : Thoi H. Ho et al.

It is certified that error appears in the above-identified patent and that said Letters Patent is hereby corrected as shown below:

Column 16,
Line 7, add the following claim: -- 19. The at least partially crosslinked elastomer of Claim 18 in which the functionalized ethylene/propylene copolymer is based on an ethylene/propylene copolymer produced via a constrained geometry single site catalyst. --

Signed and Sealed this

Twenty-fourth Day of September, 2002

Attest:

Attesting Officer

JAMES E. ROGAN
Director of the United States Patent and Trademark Office